W. H. THOSS.
GRINDING PAN AND AMALGAMATOR.
No. 112,395. Fig. 1. Patented Mar. 7, 1871.
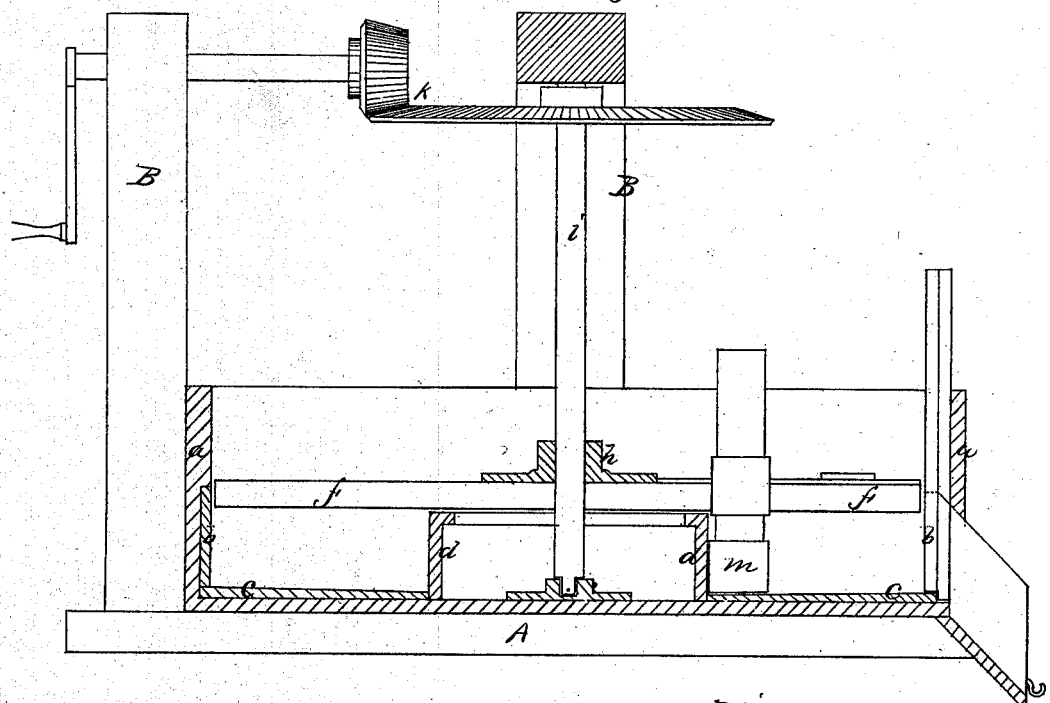
Fig. 2.
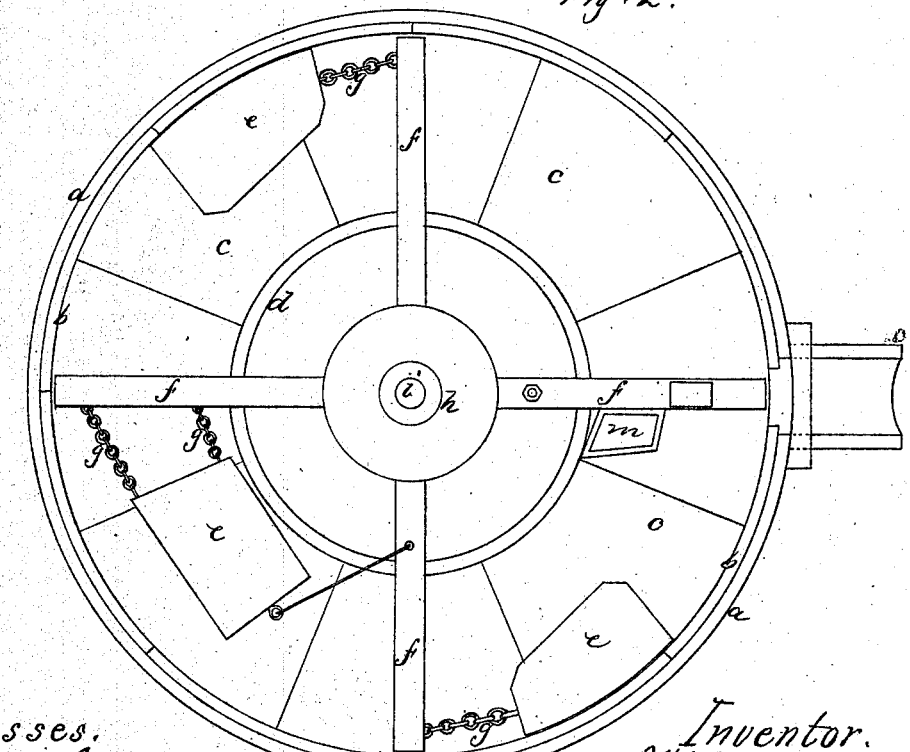
Witnesses.
Geo. H. Strong.
J. L. Boone.
Inventor.
Wm. H. Thoss
By his Atty's
Dewey & Co.

United States Patent Office.

WILLIAM H. THOSS, OF WEST POINT, CALIFORNIA.

Letters Patent No. 112,395, dated March 7, 1871.

IMPROVEMENT IN GRINDING-PANS AND AMALGAMATORS.

The Schedule referred to in these Letters Patent and making part of the same.

*To all whom it may concern:*

Be it known that I, WILLIAM H. THOSS, of West Point, county of Calaveras, State of California, have invented an Improved Grinding-Pan for Working Ores; and I do hereby declare the following description and accompanying drawing are sufficient to enable any person skilled in the art or science to which it most nearly appertains to make and use my said invention or improvements without further invention or experiment.

The object of my invention is to provide an improved grinding and amalgamating pan for gold and silver-bearing ores; and It consists in the use of a pan constructed in sections, so as to be easily transported to points difficult of access.

It also consists in the employment of a vertical revolving shaft with horizontal arms, to which are loosely attached peculiar-shaped stone grinders. These are drawn over the bottom, and also thrown out against the sides of the pan, so as to thoroughly grind the ore, while by their peculiar shape the mercury and pulp will be forced to the center.

An adjustable plow or scraper is attached to the arms, and by depressing this the mercury will be again drawn from the center through the pulp.

Referring to the accompanying drawing for a more complete explanation of my invention—

Figure 1 is a vertical section, showing the interior of my pan.

Figure 2 is a plan.

A is a platform or floor, upon which the pan stands, and B, a frame for supporting the necessary shafting.

The outer part of the tub may be made of wood, as shown at $a$.

The lining or pan is made with sides $b$ and a bottom, $c$, constructed in sections, so as to be easily transported from place to place, or removed whenever necessary.

The pan has an inner rim, $d$, and between this and the outer rim the mullers $e$ travel.

These mullers are made of stone, as being cheaper, and not wearing off so much base metal from the pan to be mixed with the amalgam.

The mullers are made somewhat wedge-shaped or tapering toward the front or inside, while the back or outside is so curved as to fit the inner periphery of the rim $b$, against which, as well as on the bottom, the grinding takes place.

The mullers are loosely connected with the arms $f$ by a chain, $g$, or other suitable device, and are carried against the outer rim of the pan by centrifugal force as they revolve.

The arms $f$ radiate from a central hub, $h$, which is keyed to the vertical shaft I. Motion is given to this shaft by the bevel-gear K, or an equivalent device.

A peculiar-shaped shoe or scraper, $m$, is attached to one or more of the arms $f$, so as to be moved up or down, as may be desired. This shoe, when down, serves to throw the mercury outward and through the pulp, and when raised, by the tap of a hammer on the arm it suffers the amalgam to be collected around the central rim $d$, which is done just before cleaning up.

The operation of my pan will be as follows:

The mullers are made to revolve with considerable rapidity, and a quantity of ore is placed in the pan with sufficient water to make a thick pulp. After about one hour and a half the ore will be reduced to a state of considerable fineness, when a sufficient quantity of mercury is added. The centrifugal force of the revolution tends to throw the mass outward, and the shape of the mullers carries it over and toward the inner rim again, so that the pulp is repeatedly exposed to the action of the atmosphere. The scraper or shoe $m$ throws the mercury outward in a shower through the pulp, so as to thoroughly mix with it and amalgamate the precious metals. Different processes will have to be employed in the pan, in addition to the one here described, and these will vary with the character of the ore and quantity of base metal which may be mixed with the pulp.

Having thus described my invention,

I desire to secure by Letters Patent—

1. In combination with the pan constructed as described, the revolving arms $f$ and the mullers $e$, constructed wedge-shaped or tapering toward the front or inside, while the outside is so curved as to fit the inner periphery of the rim $b$, substantially as and for the purpose set forth.

2. In combination with the revolving arms $f$, the mullers $e$, when constructed wedge-shaped or tapering toward the front or inside, while the outside is so curved as to fit the inner periphery of the rim $b$, substantially as and for the purpose described.

In witness that the above-described invention is claimed by me I have hereunto set my hand and seal.

W. H. THOSS. [L. S.]

Witnesses:
 GEO. H. STRONG,
 J. L. BOONE.